United States Patent Office 2,724,711
Patented Nov. 22, 1955

2,724,711
METHOD FOR THE MANUFACTURE OF 6-MERCAPTOPURINE

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application December 28, 1954,
Serial No. 478,201

4 Claims. (Cl. 260—256.5)

This invention relates to the compound 4-amino-5-formamido-6-mercaptopyrimidine and to methods of preparing the same. It is a valuable intermediate in the preparation of 6-mercaptopurine shown to have valuable properties in producing remissions in human leukemias.

The invention also contemplates a novel method for the manufacture of 4-amino-5-formamido-6-mercaptopyrimidine and the conversion of these compounds into this mercaptopurine. This application is a continuation-in-part of U. S. application Serial No. 425,036, filed April 22, 1954, by the same applicants.

The original application Serial No. 425,036 describes the preparation of 7-amino-thiazole (5,4-d) pyrimidine by the treatment of 4,5-diamino-6-mercaptopyrimidine with concentrated formic acid. An aspect of the present invention is the discovery that 4-amino-5-formamido-6-mercaptopyrimidine may be formed directly from 4,5-diamino-6-mercaptopyrimidine under less acid conditions. Evidently, the degree of acidity has a direct bearing upon whether the thiazolo or the formamido compound is formed in the reaction. Under acid condition, the 4,5-diamino-6-mercaptopyrimidine tends to cyclize while in a more alkaline medium, the thiazole ring is broken to form the formamido compound.

According to another aspect of the invention, 4-amino-5-formamido-6-mercaptopyrimidine may be formed by the initial preparation of 4-amino-5-formamido-6-benzyl-mercaptopyrimidine. In the latter case, the 6-benzyl-mercapto group precludes cyclization to the thiazolo derivative. The methods of the present invention may be illustrated as follows:

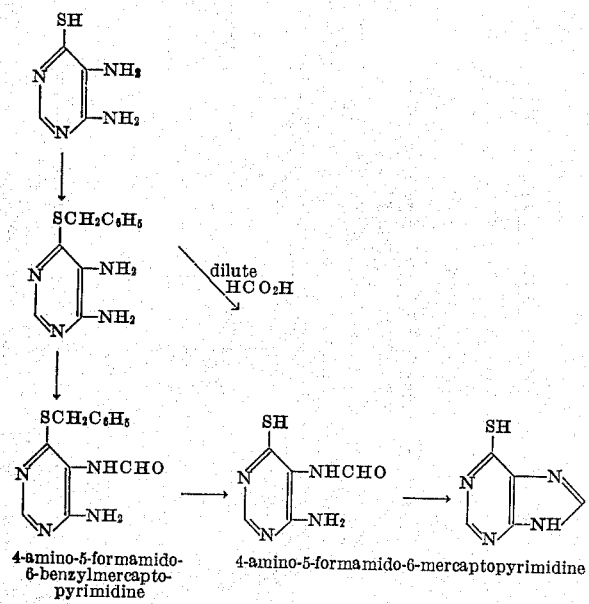

In the above equations, 4-amino-5-formamido-6-mercaptopyrimidine is readily converted, if desired, to 6-mercaptopurine by suitable methods which will be exemplified in the examples to follow:

EXAMPLE I

*4,5-diamino-6-benzylmercaptopyrimidine*

To a solution of 10 g. (.07 m.) of 4,5-diamino-6-mercaptopyrimidine in 140 ml. of 1 N sodium hydroxide was added slowly, with stirring, 12 ml. of benzyl chloride. The temperature was maintained at 10–15° during the addition. After four hours, the precipitate of crude 4,5-diamino-6-benzylmercaptopyrimidine was filtered off and recrystallized from 1 liter of water. The recrystallized product (10.5 g.) was the monohydrate and had a M. P. of 104–106°. Its ultraviolet absorption spectrum showed $\lambda_{max.}=280$ and 320 m$\mu$ at pH 1 and $\lambda_{max.}$ 310 m$\mu$ at pH 11.

*4-amino-5-formamido-6-benzylmercaptopyrimidine*

5 g. of 4,5-diamino-6-benzylmercaptopyrimidine was heated on the steam bath with 100 ml. of 98–100% formic acid for two hours and the mixture taken to dryness under reduced pressure. The product was washed with 100 ml. of absolute alcohol and 100 ml. of ether. The 4-amino-5-formamide - 6-benzylmercaptopyrimidine had a M. P. of 214–215° and its ultraviolet spectrum showed $\lambda_{max.}=245$ and 300m$\mu$ at pH 1 and max.=282 m$\mu$ at pH 11.

*4-amino-5-formamido-6-mercaptopyrimidine*

To 250 ml. of liquid ammonia was added 5.55 g. of 4-amino-5-formamido - 6-benzylmercaptopyrimidine and then, in small portions, with stirring, 1.2 g. of sodium. The ammonia was then allowed to evaporate spontaneously. The residue was dissolved in 50 ml. of water, filtered to remove a small amount of oily material, and the filtrate acidified to pH 5 with glacial acetic acid. The 4-amino-5-formamido-6-mercaptopyrimidine precipitated as colorless needles which were filtered off and recrystallized from 300 ml. of hot water. The purified product melted at 255° and had ultraviolet absorption maxima at 240 and 350 m$\mu$ at pH 1 and max. at 245 and 292 m$\mu$ at pH 11.

A more direct and perhaps preferred method of forming this compound is indicated below:

EXAMPLE II

*4-amino-5-formamido-6-mercaptopyrimidine*

2 g. of 4,5-diamino-6-mercaptopyrimidine was dissolved in 50 ml. of 50% formic acid. After one hour at 25°, colorless needles of 4-amino-5-formamido-6-mercaptopyrimidine precipitated. After chilling, the product (1 g.) was filtered off, washed with water and then dried in a vacuum desiccator. An additional 0.7 g. of product was recovered from the filtrate by addition of concentrated ammonium hydroxide until the pH was 5. The product melted at 255° and had a spectrum identical with that prepared from 4-amino-5-formamido-6-benzyl-mercaptopyrimidine by treatment with sodium in liquid ammonia.

EXAMPLE III

*6-mercaptopurine*

100 mg. of 4-amino-5-formamido-6-mercaptopyrimidine was dissolved in 0.28 ml. of 2.1 N sodium hydroxide and the solution taken to dryness under reduced pressure. The residue was heated gradually to 240° in an oil bath and kept at 240° for twenty minutes. The residue was then dissolved in 15 ml. of water and the solution brought to pH 5 with acetic acid. Upon chilling, 70 mg. of 6-mercaptopurine precipitated out and another 9 mg. was shown to be present in the filtrate by its ultraviolet absorption spectrum: $\lambda_{max.} = 325$ m$\mu$ at pH 1, and $\lambda_{max.} = 312$ m$\mu$ at pH 11.

EXAMPLE IV

*6-mercaptopurine*

110 mg. of 4-amino-5-formamido-6-mercaptopyrimidine was heated with 5 ml. of formamide at 200° for 15 minutes. The solution was cooled and diluted with an equal volume of water. 6-mercaptopurine separated out as a nearly colorless crystalline precipitate.

EXAMPLE V

*6-mercaptopurine*

20 mg. of 4-amino-5-formamido-6-mercaptopyrimidine was heated at 250° for 20 minutes. The melt turned dark and resolidified. After cooling, the residue was dissolved in 10 ml. of dilute sodium hydroxide and acidified to pH 5 with acetic acid, whereupon a precipitate of the crude 6-mercaptopurine was formed.

EXAMPLE VI

*6-benzylmercaptopurine*

A mixture of 350 mg. of 4-amino-5-formamido-6-benzylmercaptopyrimidine and 5 ml. of formamide was heated at 200° for 10 minutes. The solution was cooled and diluted with 20 ml. of water. A colorless crystalline precipitate of 6-benzylmercaptopurine hydrate (320 mg.), M. P. 188–189° dec., separated and was collected.

We claim:

1. The method of forming 4-amino-5-formamido-6-mercaptopyrimidine which comprises solution of 4,5-diamino-6-mercaptopyrimidine in aqueous formic acid.

2. The method set forth in claim 1 wherein the 4,5-diamino-6-mercaptopyrimidine is dissolved in aqueous formic acid containing substantially more than 20% water.

3. The method set forth in claim 1 wherein the 4,5-diamino-6-mercaptopyrimidine is dissolved in approximately 50% formic acid and allowed to stand for about one hour.

4. As a new compound 4-amino-5-formamido-6-mercaptopyrimidine.

No references cited.